US011269662B2

(12) United States Patent
Kautzleben et al.

(10) Patent No.: US 11,269,662 B2
(45) Date of Patent: Mar. 8, 2022

(54) DRIVING DIFFERENT TYPES OF USER INTERFACES WITH A SINGLE BACKEND VIEW CONTROLLER

(71) Applicant: SAP SE, Walldorf (DE)

(72) Inventors: Reinhold Kautzleben, Karlsruhe (DE); Eduardo Berlitz, Porto Alegre (BR); Eduardo Carvalho, Rio de Janeiro (BR); Alexandre Faltz, Porto Alegre (BR); Joachim Fitzer, Frankfurt (DE); Willian Mendes, São Paulo (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/208,984

(22) Filed: Dec. 4, 2018

(65) Prior Publication Data

US 2020/0174803 A1 Jun. 4, 2020

(51) Int. Cl.
*G06F 3/048* (2013.01)
*G06F 9/451* (2018.01)
*G06F 16/25* (2019.01)
*G06F 8/35* (2018.01)
*G06F 8/38* (2018.01)
*G06F 3/04815* (2022.01)

(52) U.S. Cl.
CPC ............... *G06F 9/451* (2018.02); *G06F 8/35* (2013.01); *G06F 8/38* (2013.01); *G06F 16/252* (2019.01); *G06F 3/04815* (2013.01)

(58) Field of Classification Search
CPC .......... G06F 9/451; G06F 16/252; G06F 8/35; G06F 8/38; G06F 3/04815
See application file for complete search history.

(56) References Cited

U.S. PATENT DOCUMENTS

| 7,844,911 B2 * | 11/2010 | Austin | G06F 3/0481 715/763 |
| 2005/0257205 A1 * | 11/2005 | Costea | G06F 8/65 717/168 |
| 2010/0088619 A1 * | 4/2010 | Rath | G06F 8/34 715/764 |
| 2012/0041990 A1 * | 2/2012 | Kreindlina | G06F 16/248 707/805 |
| 2012/0102414 A1 * | 4/2012 | Demant | G06F 16/958 715/753 |
| 2012/0166977 A1 * | 6/2012 | Demant | G06F 8/38 715/762 |
| 2012/0188264 A1 * | 7/2012 | Schultz | H04L 29/08792 345/581 |

(Continued)

*Primary Examiner* — Mahelet Shiberou
(74) *Attorney, Agent, or Firm* — Sterne, Kessler, Goldstein & Fox P.L.L.C.

(57) ABSTRACT

Disclosed herein are system, method, and computer program product embodiments for driving multiple user interfaces using a backend view controller. A view interface system that is capable of displaying multiple user interfaces of different view formats may receive a data set request to display a data set in a particular view format. The view interface system may then transmit, to the backend view controller, the data set request and receive an indication that the data set is exposed by the backend view controller. Based on the indication, the view interface system may perform data binding of the data set to interface objects associated with the view format to form a user interface based on the view format and display the user interface.

10 Claims, 4 Drawing Sheets

(56) References Cited

U.S. PATENT DOCUMENTS

| | | | |
|---|---|---|---|
| 2014/0006368 A1* | 1/2014 | Moser | G06F 9/541 |
| | | | 707/705 |
| 2014/0280691 A1* | 9/2014 | Buerner | H04L 67/02 |
| | | | 709/217 |
| 2015/0142855 A1* | 5/2015 | Fast | G06F 16/27 |
| | | | 707/803 |
| 2017/0185609 A1* | 6/2017 | Braghin | G06F 8/38 |
| 2018/0144016 A1* | 5/2018 | Bestfleisch | G06F 11/302 |
| 2019/0205103 A1* | 7/2019 | Yadav | G06F 8/30 |

* cited by examiner

DRIVING DIFFERENT TYPES OF USER INTERFACES WITH A SINGLE BACKEND VIEW CONTROLLER

BACKGROUND

Current user interface frameworks use multiple intermediary controllers to separate data from the user interfaces used to view that data. The intermediary controllers are typically installed on the same device as the user interface (e.g., a client device) and connect the data to the user interfaces by exchanging data with a data source, and formatting the data to be displayed by the user interfaces. Different types of user interfaces such as a two-dimensional or three-dimensional interface each requires a separate intermediary controller that supports that specific interface. While this implementation generally may reduce the amount of programming required for the user interface, intermediary controllers still must be developed to work with the different user interfaces and require additional programming in order to maintain compatibility with existing user interfaces when they are updated. Intermediary controllers are specific to each user interface and must be installed on each user device which could lead to inconsistent views across different user devices if each user device has a different intermediary controller for a specific user interface.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for driving multiple user interfaces using a single backend view controller.

A user interface framework may employ a backend view controller implemented on a backend device that is remote from a user device that includes a view interface system. The view interface system may be used for providing a user interface that displays data from a data source. The backend view controller may act as a conduit between the view interface system and the data source by translating inputs from the view interface system into commands for manipulating or retrieving data from the data source.

By shifting the backend view controller to a backend device (instead of being implemented on the user device), a single backend view controller may be used to support multiple view formats of user interfaces because the backend view controller on the backend device is able to maintain a shared user interface state across multiple user interfaces. In other words, there may be a many-to-one relationship between the number of user interfaces provided at a user device (i.e., many) and the number of view controllers necessary to support each interface (i.e., one). This is in contrast to when the view controller is implemented on a user device. In such implementations, a separate view controller is needed for each view format and must be implemented on each user device.

Implementing the backend view controller on a backend device also enables a common view between multiple user devices even if the user devices utilize different view formats for their user interfaces because the backend view controller utilizes the same data set to maintain the same user interface state across the user interfaces no matter which devices are attempting to access the data.

One example of a view controller is a ViewModel construct implemented within the Model View ViewModel (MVVM) design scheme. One example of a view interface system is a View construct of MVVM. A data source may include or provide an interface or business logic that exposes the data to the view controller. One example of such an interface is the Model construct of MVVM. The interface includes processes or functions that may be executed by view controller in order to access data of the data source. The user interface framework may implement the view controller on a backend device and the view interface system on a client device. The client device may be any device that is separate or remote from the backend device, such as any device operated by a user.

The backend device may be any device that acts as a data source that stores data to be provided to the view interface system. Examples of such backend devices include but are not limited to servers, data sources, data lakes, data silos, message streams, relational databases, semi-structured data (CSV, logs, xml, etc.), unstructured data, binary data (images, audio, video, etc.), or other suitable stored data, both on-premises and on the cloud. By implementing the view controller in the backend closer to the data source, the view controller may dynamically expose the data from the data source in a variety of different interfaces. Accordingly, the user interface framework may employ a single view controller for providing different types of user interfaces to the view interface system.

The view interface system may utilize data binding to establish a connection between the user interface and the data source based on the data that is transported to and from the data source. This way, a single implementation of the view controller may be used for presenting multiple view formats such as a two-dimensional interface, three-dimensional interface, and a virtual reality interface, just to name a few examples, even when using different user interface technologies. Bi-directional communication channels may be established between the view interface system and the view controller to transfer data. After binding the view interface system and the view controller, updated data may also be transferred through the bi-directional communication channels.

As noted above, employing a single view controller reduces development efforts to support multiple user interface technologies by being able to support a shared user interface state across multiple view formats for user interfaces. For example, the same data set from a data source that is selected in a two-dimensional view format (or interface) can be viewed simultaneously in a virtual reality scene or vice versa. This functionality is enabled because the state of the user interface provided by the view interface is no longer replicated by the different view controllers implemented at the user device, but instead by a centrally implemented view controller on a backend device. The bi-directional communication channels ensure a consistent transport of the data to and from the view interface.

Data visualization across multiple view formats in user interfaces can be challenging based on the immense amount of data that is generally available through data sources. Data visualization should be flexible with regards to the visualization methods chosen to view the data by being able support multiple view formats, such as two dimensional (2D), three dimensional (3D), and virtual reality (VR) on the same device and through the same application. View formats may also be referred to as a type of user interface.

Accordingly, embodiments of this disclosure allow a backend visualization system to provide multiple view formats to front-end devices using a single view controller. These features of example embodiments will now be discussed in greater detail with respect to the corresponding figures.

Figure 1:
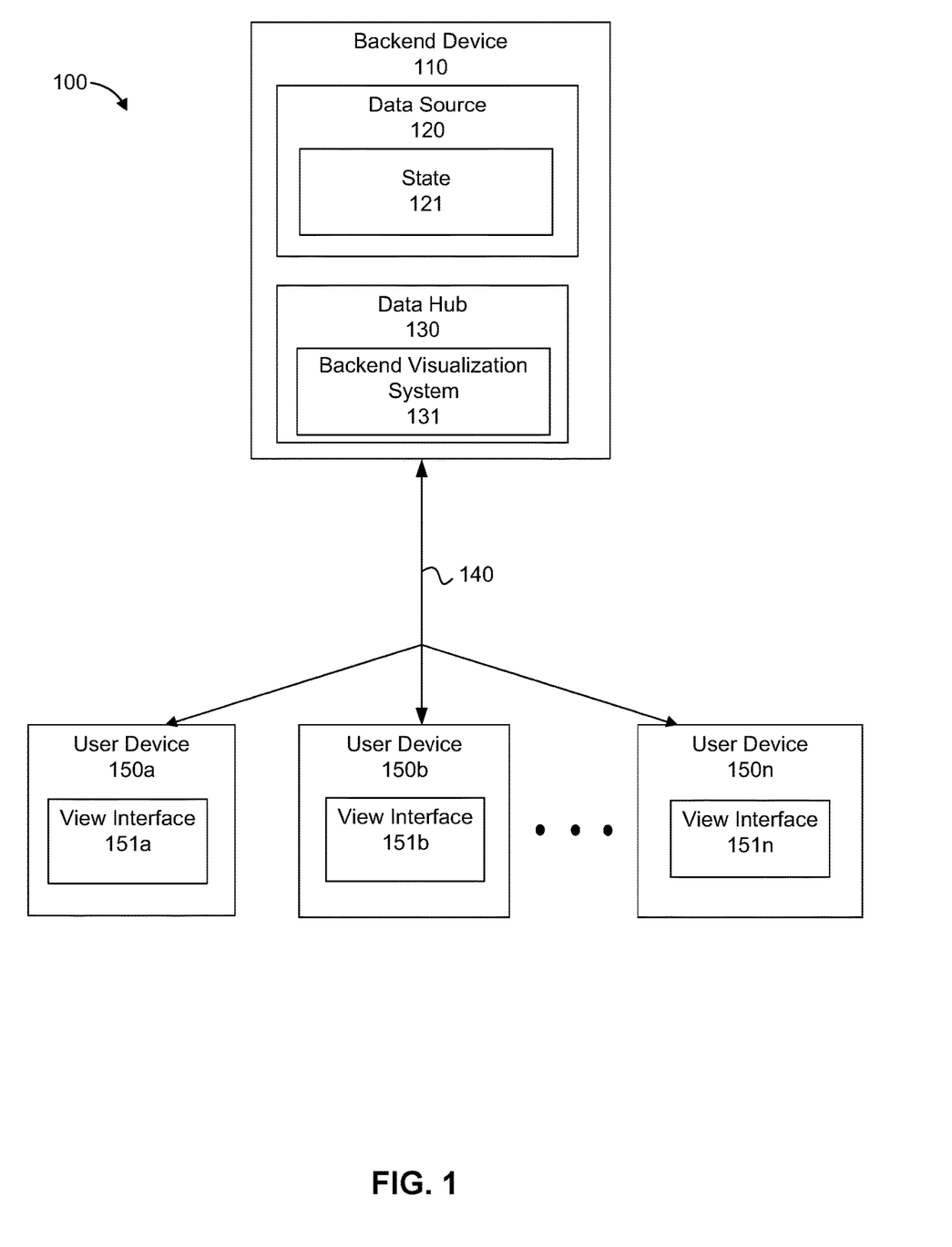
FIG. 1 is a block diagram of an environment including a user interface architecture, according to some embodiments.

FIG. 1 is a block diagram illustrating environment 100 having backend device 110, and user devices 150a-n for providing multiple user interfaces within a user interface architecture, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 includes backend device 110, data source 120, data hub 130, communication channel 140, and any number of user devices 150a-n.

Backend device 110 may be implemented as any number of data storage systems storing data. Backend device 110 includes data source 120 which may be a database management system or relational database tool. Data source 120 may further be a message queue or stream processing platform such as Apache Kafka or Apache Spark or other data storage systems like Apache Hadoop, HDFS, or Amazon S3, to name just some examples. Data source 120 may be a data lake, data silo, semi-structured data system (CSV, logs, xml, etc.), unstructured data system, binary data repository, or other suitable repository. Data source 120 may be implemented as a one or more devices.

Data source 120 may include state 121 which may reflect the current circumstances of data stored by data source 120. State 121 reflects changes from user devices 150a-n of data source 120. In an embodiment, state 121 may be represented by an appropriately formatted tuple, e.g., using JSON, XML, or other human readable transfer protocol. When state 121 changes, either based on a change to data source 120, the reception of inputs from data hub 130 or user devices 150a-n, data hub 130 may propagate the changed data to view interfaces 151a-n which may have been bound (through a data-binding process discussed below) to data source 120 through backend visualization system 131. In an embodiment, data hub 130 may transmit only a delta, i.e., the differences between a current state as compared to a previous state, of changed data in the state to the other front-ends to improve the efficiency of the transaction. Because backend visualization system 131 is implemented on backend device 110, it is capable of maintaining a consistent state 121 across multiple user interfaces that are accessing data source 120. This means that the same data set may be used across any number of (or all) user interfaces of different view formats and across different user devices 150a-n.

Backend device 110 also may include data hub 130 which orchestrates data from data source 120 capable of combining structured and unstructured (e.g., data in natural language format) data. Data hub 130 may process data such as transforming, converting, modifying, managing, analyzing or otherwise interacting with data from data source 120, and may provide the processed data to a user interface. Exemplary operations conducted within data hub 13 may include, but are not limited to: converting data from one format to another, preparing data for visualization, organizing the data, mining the data using regular expressions, natural language processors, or other mechanism, sharing data between different web applications, editing video/audio files, and/or any of a myriad of suitable interactions. In an embodiment, data hub 130 executes these operations in real-time using parallel and distributed processing, channels, pipelines, and other big-data manipulation techniques.

Data hub 130 may include backend visualization system 131 which may act as an interface between data source 120 and view interfaces 151a-n. In another embodiment, backend visualization system 131 may be implemented separately from data hub 130 as another component of backend device 110. Backend visualization system 131 may receive commands from any one of user devices 150a-n, retrieve data from data source 120, and process the retrieved data based on preconfigured properties which may then be displayed by one of view interfaces 151a-n. Backend visualization system 131 exposes navigation and manipulation functionality to view interfaces 151a-n to navigate and manipulate data provided by data source 120.

Data hub 130 may incorporate data processing pipelines and other transformational approaches to provide advance analytics and intelligent data based on the contents of data source 120. Data hub 130 may run various predefined or custom-built functions, referred to herein as operations, against the data to transform, organize, and analyze the data and/or perform additional programmatic functions with the data. Data hub 130 may present the manipulated (or raw) data, derived analytics, visualizations, and other results to a user interface provided by view interfaces 151a-n which are located at user devices 150a-n, respectively. After performing data binding with backend visualization system 131, view interfaces 151a-n may receive, pull, and organize data from data source 120 through backend visualization system 131. Data binding may include two-way binding and declarative data binding using binding expressions. Two-way binding enables view interfaces 151a-n to be bound to backend visualization system 131 and vice versa. Accordingly, when properties in the data set are changed, user interface components in view interfaces 151a-n that are bound to that particular data set are updated. Similarly, when user interface components in view interfaces 151a-n are updated, those changes are sent to the data set.

Communication channel 140 may be a wired and/or wireless pipeline or connection between data source 120, data hub 130, and backend visualization system 131, and other components in backend device 110. Communication channel 140 may transmit data using any suitable transfer protocol, communication protocol, or other mechanism. Communication channel 140 may provide a way to connect different, concurrent operations, functions, data source 120, and backend visualization system 131. In an embodiment, communication channel 140 may be bi-directional, i.e., used to both send and receive data between backend device 110 and user devices 150a-n. Although communication channel 140 is illustrated in the example of FIG. 1 as a single channel, one skilled in the relevant art(s) will understand that communication channel 140 may represent two or more channels providing communications between backend device 110 and user devices 150a-n. Updates to data in data source 120 may be communicated through communication channel 140 to any view interfaces that have initiated data binding with that data such that the updates can be displayed using the appropriate view interface. In this manner, data binding essentially allows various user interface components of view interfaces 151a-n to subscribe to and be associated with certain data provided by backend visualization system 131. In an embodiment, communication channel 140 may be implemented as a websocket connection.

User devices 150a-n may be implemented as any device that can be controlled by an end user such as but not limited to a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. User devices 150a-n may be managed or otherwise controlled by business, organization, or other suitable group.

User devices 150a-n may include view interfaces 151a-n, respectively. In an embodiment, view interfaces 151a-n are composed of visual components that present data received from backend device 110 in a specified format. Backend visualization system 131 provides a set of views (or interfaces) that correspond to a visual component in the view interface. View interfaces 151a-n may utilize data-binding to bind visual components to the interfaces provided by backend visualization system 131. View interfaces 151a-n may be considered visual containers for presenting certain data provided by data source 120 through backend visualization system 131.

Because view interfaces 151a-n are accessing the same data set, even if they are utilizing different view formats through the same backend visualization system, view interfaces 151a-n operate to present a common view of the data set which facilitates collaboration across user devices 150a-n.

Figure 2:
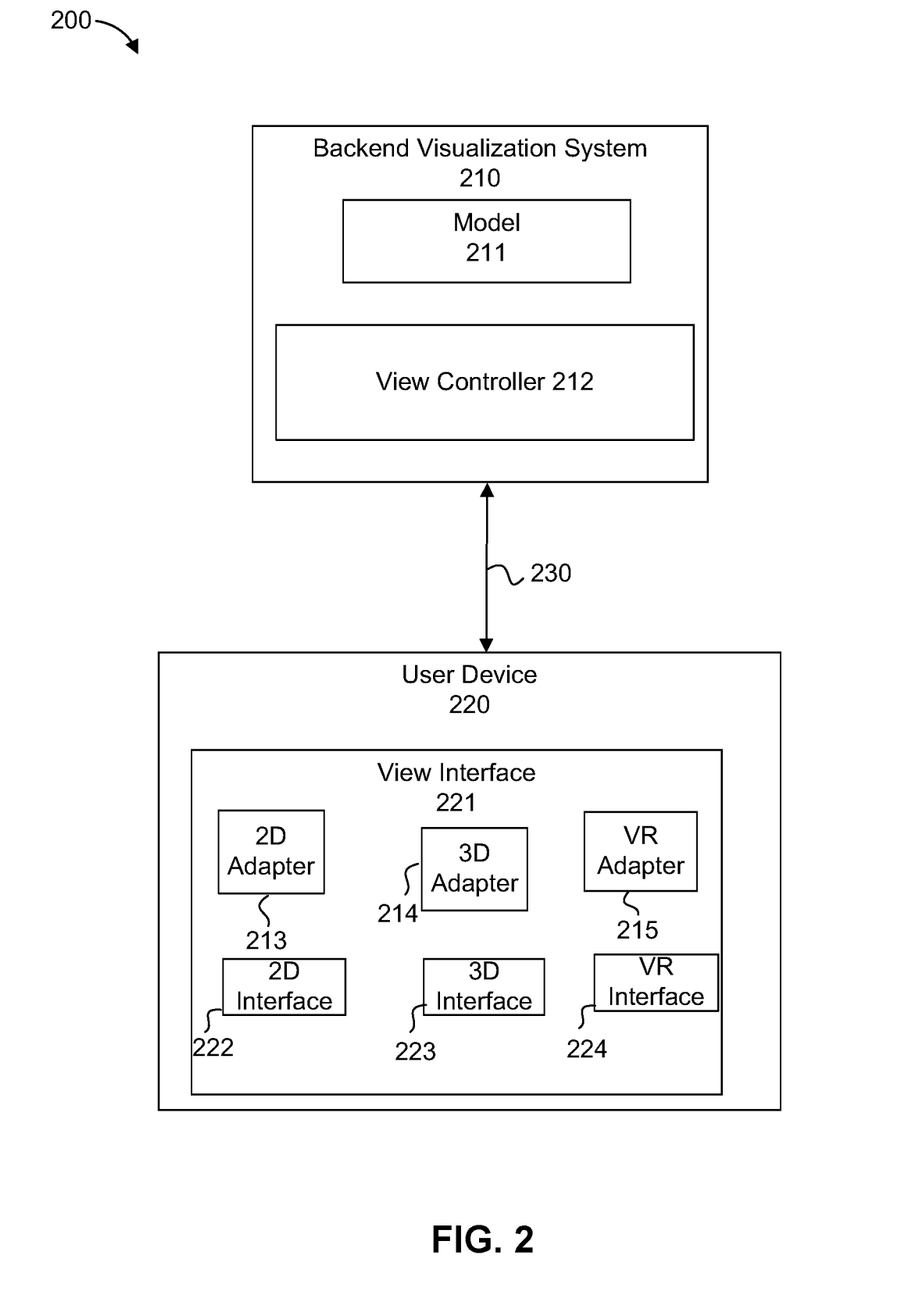
FIG. 2 is a block diagram of a user interface architecture, according to some embodiments.

FIG. 2 is a block diagram illustrating a user interface architecture 200 having backend visualization system 210, user device 220, and communication channel 230. The implementation provided in FIG. 2 is merely exemplary, and one skilled in the relevant art(s) will appreciate that many approaches may be taken to provide a user interface architecture 200 in accordance with this disclosure. Backend visualization system 210 and user device 220 of user interface architecture 200 may be representative of backend visualization system 131 and any one of user devices 150a-n described in reference to FIG. 1. Backend visualization system 210 may include model 211 and view controller 212, and user device 220 may include view interface 221 which may include a two-dimensional (2D) interface 222, three-dimensional (3D) interface 223, and virtual reality (VR) interface 224, which are representative of user interfaces provided in those formats.

Model 211 provides support for different views of data from a data source (e.g., data source 120) that may be accessed by view interface 221 in user device 220. In an embodiment, model 211 may include business logic that exposes functions that may be performed on the data of the data source. In another embodiment, model 211 may be separate the the business logic. Model 211 may act as a gateway between data in a data source and view controller 212.

View controller 212 and view interface 221 communicate via data-binding, method calls, properties, and notifications (or events) associated with data that is to be provided by view controller to view interface 221 through model 211. This may be accomplished by view controller 212 exposing methods, commands, properties of data, and other functions that may include, among other things: maintain the state of interfaces provided by view interface 221, manipulate model 211 (and the underlying data from a data source) based on inputs received by view interface 221, and transfer notifications of updated data to view interface 221 if data binding has been performed. Interaction between view controller 212 and model 211 may be implemented through interfaces in view controller 212 that enable retrieval and manipulation of data through model 211.

View controller 212 may establish data binding with any number of view adapters that support multiple view formats for user interfaces. In an embodiment, the view adapters are installed on user device 220, such as part of view interface 221. In another embodiment, the view adapters may be installed in view controller 212. Examples of view adapters include but are not limited to two-dimensional (2D) adapter 213 for supporting two-dimensional interfaces, three dimensional (3D) adapter 214 for supporting three-dimensional interfaces, and virtual reality (VR) adapter 215 for supporting virtual reality interfaces. As new view formats are created, specific adapters that support those new formats may be installed in view interface 221 221 to update the functionality of view interface 221.

View interface 221 provides a structured user interface for displaying data that is provided through backend visualization system 210. View interface 221 may receive inputs from a user of user device 220, and transmit those inputs to backend visualization system 210 for processing. Examples of inputs include but are not limited to manipulation commands, navigation commands, and other interaction commands related to the displayed data. In an embodiment, view interface 221 does not include any capability to process the inputs but merely acts as a conduit for transferring user inputs to backend visualization system 210. In an embodiment, view controller 212 receives the inputs provided from view interface 221 and translates the inputs to commands that may be understood by model 211.

View interface 221 provides access to multiple user interfaces having different view formats such as 2D interface 222, 3D interface 223, and VR interface 224. View interface 221 can provide these view formats simultaneously using the same data set from a data source through data-binding between view interface 221 and view controller 212. In other words, instead of implementing a specific view controller on user device 220 to handle each view format (i.e., one view controller for 2D interface 222, 3D interface 223, and VR interface 224), shifting view controller 212 to backend visualization system 210 at a backend device (e.g., backend device 110) enables user interface architecture 200 is able to employ a single view controller 212 to handle a plurality if not all view formats.

View interface 221 uses data binding to establish a connection to any of 2D interface 222, 3D interface 223, and VR interface 224 and the corresponding adapters within view interface 221. For example, 2D interface 222 may bind with data through 2D adapter 213; 3D interface 223 may bind with data through 3D adapter 214, and VR interface 224 may bind with data through VR adapter 215. In an embodiment, there may be one adapter per view format. For example, two different 2D views may use 2D interface 222 while two different 3 views may use 3D interface 223. The role of each adapter is to support the data binding capabilities of its respective view format and to implement the client portion of communication channel 230.

In an embodiment, each adapter in view interface 221 may have access to the same data set which obviates the need to store data in different formats for each view format. Instead, each adapter is responsible for translating the data set into a format that can be used by the corresponding view format of view interface 221.

As noted above, data binding may refer to connecting user interface elements of the various views to data at a data source where view controller 212 enables seamless communication between view interface 221 and the data source. Accordingly, establishing a connection may involve the user interface elements subscribing to data notifications associated with data elements from the data source. When the data element changes value, a data notification may be generated and any user interface elements that are bound to that data element may reflect the changes automatically. Those changes may be transmitted through communication channel 230. In addition to transferring data changes and notifications, communication channel 230 may also be responsible for transmitting user inputs from view interface 221 to view controller 212.

Because of this implementation, view interface 221 may request one or more different view formats for its user interface. For example, 2D interface 222, 3D interface 223, and/or VR interface 224 may implement a data binding procedure to specify data that is to be transported to and from backend visualization system 210. In an embodiment, the data binding procedure may include a request from 2D interface 222, 3D interface 223, and/or VR interface 224 to be bound to one or more data elements at a data source. View controller 212 may receive the request and facilitate the connection between the requesting view interface and the requested data elements. The requested data elements or data set may be the same for 2D interface 222, 3D interface 223, and/or VR interface 224. That is, more than one view interface may be bound to the same data set which provides for a common view to the same data set across the different view formats.

Figure 3:
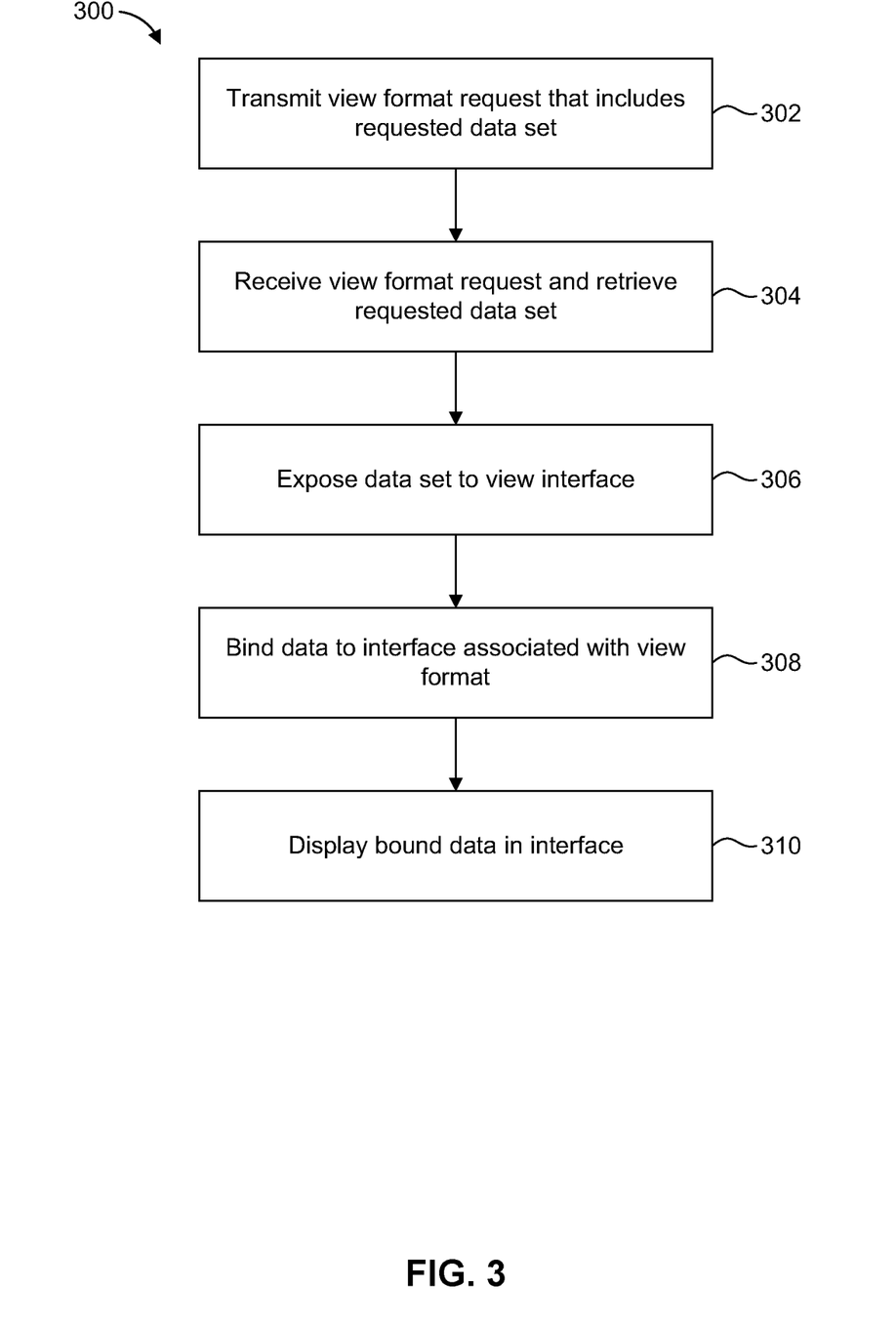
FIG. 3 is a flowchart illustrating a method of driving multiple user interfaces using a backend view controller.

FIG. 3 is a flowchart illustrating a method of driving multiple user interfaces using a backend view controller, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

As a non-limiting example with regard to FIGS. 1 and 2, the steps of method 300 may be performed by components of data source 120, backend visualization system 131 and user device 150a or some combination thereof. While method 300 will be discussed below as being performed by one or more of these components, other components may store code necessary to execute some or all of the steps of method 300. Method 300 will be described with reference to FIGS. 1 and 2. However, method 300 is not limited to that example embodiment In 302, view interface may receive a view format request that includes a requested data set from a data source. For example, view interface 221 may receive a view format request based on user input provided to user device 220 to retrieve a data set from data source 120. View interface 221 transmits the view format request, via communication channel 230, to view controller 212 in backend visualization system 210. The view format request may specify a view format, such as a two-dimensional interface, three-dimensional interface, and/or virtual reality interface along with the requested data set to be retrieved from the data source. In an embodiment, the requested data set is not specific for a specific view format but represents data without any visualization information, such as the layout. Visualization of the requested data set may be performed by view interface 221. In an embodiment, the view format request may only specify the requested data set. The view format may be considered a type of view for the user interface.

In 304, the view controller may request a data set to be retrieved from the data source. For example, backend visualization system 210, after receiving the request from view interface 151a, may request the requested data set from data source 120. The data set may then be held by backend visualization system 210 until the data binding procedure is completed.

In 306, the view controller may expose the data set to the requesting view interface to enable binding. For example, view controller 212 may expose the data set from a data source to view interface 221. View controller 212 may transmit an indication to view interface 221 via communication channel 230 that the data set is exposed and ready for binding.

In 308, view interface may update data bindings with the exposed data set based on the view format specified by the user input. For example, the specific user interface (e.g., 2D interface 222, 3D interface 223, and/or VR interface 224) of view interface 221 may bind with the exposed data set through the corresponding adapter. In an embodiment, the corresponding adapter may generate a reference to the requested data set that will connect it to the requesting user interface of view interface 221.

In 310, view interface may display the bound data in the view format specified by the user input. For example, if 2D interface 222 requested the data set, 2D interface 222 will display the bound data set on user device 220.

Figure 4:
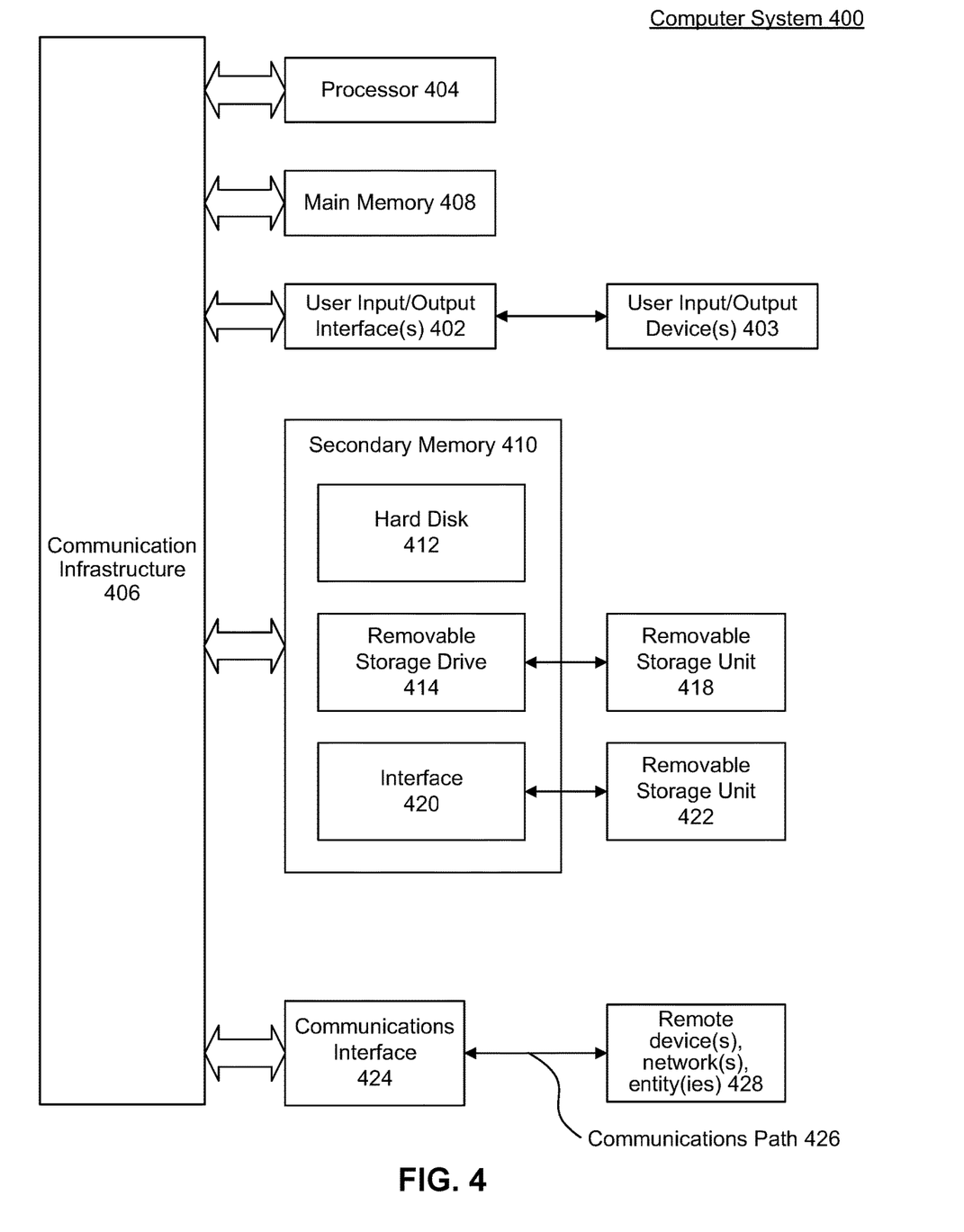
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
  receiving, at a view interface system, a data set request to display a data set in a view format;
  exposing, by a backend view controller, a plurality of functions that may be performed on the data set, wherein the plurality of functions includes the data set request and a user input function;
  transmitting, to the backend view controller, the data set request via a communications channel, wherein the backend view controller is located on a backend device remote from the view interface system, and wherein the backend view controller maintains a first state of the data set, wherein the backend view controller comprises a plurality of view adapters including a view adapter and a second view adapter, and wherein the view adapter corresponds to the view format and the second view adapter corresponds to a second view format;
  receiving, at the view interface system via the communications channel from the backend view controller, an indication the data set is exposed by the backend view controller;
  performing, based on the indication, two-way data binding of the data set to interface objects associated with the view format and provided by the view interface system to form a user interface based on the view format, wherein the two-way data binding further comprises:
    facilitating, by the backend view controller, a connection between the data set and the interface objects;
    receiving, from the backend view controller by the view interface system, a first update when a property of the data set is modified, wherein the first update represents a delta between the first state and a second state of the data set and wherein the second state reflects a modification to the property of the data set; and
    transmitting, from the view interface system to the backend view controller, a second update when an interface object of the interface objects is modified, wherein the second update results in updating the second state to a third state of the data set;
  displaying, by the view interface system, the user interface;
  transmitting, by the view interface system for processing by the backend view controller, the user input function associated with the displayed data;
  translating the user input function to a command for manipulating the displayed data;
  receiving, at the view interface system, a second data set request to display the data set in the second view format, wherein the second view format is different from the view format, and wherein the view format is a two-dimensional interface and the second view format is one of a three-dimensional interface or a virtual reality interface, and the view interface system transmits to the backend view controller requests associated with the view format and the second view format;
  transmitting, to the backend view controller, the second data set request via the communications channel;
  receiving, at the view interface system via the communications channel from the backend view system, the data set;
  performing, by the view interface system, another two-way data binding of the data set to second interface objects associated with the second view format to form a second user interface based on the second view format;
  displaying, by the view interface system, the second user interface;
  receiving, by the view interface system, a data notification regarding a change to at least one data element in the data set;
  updating, based on the data notification, the user interface to reflect the change to the at least one data element; and
  updating, based on the data notification, a second user interface to reflect the change to the at least one data element.

2. The method of claim 1, wherein the view format comprises at least one of a two-dimensional interface, a three-dimensional interface, or a virtual reality interface.

3. The method of claim 1, the performing further comprising:
  connecting the view interface system to the backend view controller through the view adapter to provide the view format; and
  connect the view interface system to the backend view controller through the second view adapter to provide the second view format.

4. A system, comprising:
  a memory; and
  at least one processor coupled to the memory and configured to:
    receive, at a view interface system, a data set request to display a data set in a view format;
    expose, by a backend view controller, a plurality of functions that may be performed on the data set, wherein the plurality of functions includes the data set request and a user input function;
    transmit, to the backend view controller, the data set request via a communications channel, wherein the backend view controller is located on a backend device remote from the view interface system, and wherein the backend view controller maintains a first state of the data set, wherein the backend view controller comprises a plurality of view adapters including a view adapter and a second view adapter, and wherein the view adapter is the view format and the second view adapter corresponds to a second view format;

receive, at the view interface system via the communications channel from the backend view controller, an indication the data set is exposed by the backend view controller;

perform, based on the indication, two-way data binding of the data set to interface objects associated with the view format and provided by the view interface system to form a user interface based on the view format, wherein the two-way data binding further comprises:

facilitating, by the backend view controller, a connection between the data set and the interface objects;

receiving, from the backend view controller by the view interface system, a first update when a property of the data set is modified, wherein the first update represents a delta between the first state and a second state of the data set and wherein the second state reflects a modification to the property of the data set; and transmitting, from the view interface system to the backend view controller, a second update when an interface object of the interface objects is modified, wherein the second update results in updating the second state to a third state of the data set;

display, by the view interface system, the user interface in the view format; and transmit, by the view interface system to the backend view controller, the user input function associated with the displayed data;

translate the user input function to a command for manipulating the displayed data;

receive, at the view interface system, a second data set request to display the data set in the second view format, wherein the second view format is different from the view format, and wherein the view format is a two-dimensional interface and the second view format is one of a three-dimensional interface or a virtual reality interface, and the view interface system transmits to the backend view controller requests associated with the view format and the second view format;

transmit, to the backend view controller, the second data set request via the communications channel;

receive, at the view interface system via the communications channel from the backend view system, the data set;

perform, by the view interface system, another two-way data binding of the data set to second interface objects associated with the second view format to form a second user interface based on the second view format;

display, by the view interface system, the second user interface;

receive, by the view interface system, a data notification regarding a change to at least one data element in the data set;

update, based on the data notification, the user interface to reflect the change to the at least one data element; and update, based on the data notification, a second user interface to reflect the change to the at least one data element.

5. The system of claim 4, wherein the view format comprises at least one of a two-dimensional interface, a three-dimensional interface, or a virtual reality interface.

6. The system of claim 4, wherein the at least one processor is further configured to:

connect the view interface system to the backend view controller through the at least one view adapter to provide the view format; and connect the view interface system to the backend view controller through the second view adapter to provide the second view format.

7. A non-transitory computer-readable device having instructions stored thereon that, when executed by at least one computing device, cause the at least one computing device to perform operations comprising:

receiving, at a view interface system, a data set request to display a data set in a view format;

exposing, by a backend view controller, a plurality of functions that may be performed on the data set, wherein the plurality of functions includes the data set request and a user input function;

transmitting, to a backend view controller, the data set request via a communications channel, wherein the backend view controller is located on a backend device remote from the view interface system, and wherein the backend view controller maintains a first state of the data set, wherein the backend view controller comprises a plurality of view adapters including a view adapter and a second view adapter, and wherein the view adapter is the view format and the second view adapter corresponds to a second view format;

receiving, at the view interface system via the communications channel from the backend view controller, an indication the data set is exposed by the backend view controller;

performing, based on the indication, two-way data binding of the data set to interface objects associated with the view format and provided by the view interface system to form a user interface based on the view format, wherein the two-way data binding further comprises:

facilitating, by the backend view controller, a connection between the data set and the interface objects;

receiving, from the backend view controller by the view interface system, a first update when a property of the data set is modified, wherein the first update represents a delta between the first state and a second state of the data set and wherein the second state reflects a modification to the property of the data set; and transmitting, form the view interface system to the backend view controller, a second update when an interface object of the interface objects is modified, wherein the second update results in updating the second state to a third state of the data set;

displaying, by the view interface system, the user interface;

transmitting, by the view interface system for processing by the backend view controller, the user input function associated with the manipulating the displayed data;

translating the user input function to a command for manipulating the displayed data;

receiving, at the view interface system, a second data set request to display the data set in the second view format, wherein the second view format is different from the view format, and wherein the view format is a two-dimensional interface and the second view format is one of a three-dimensional interface or a virtual reality interface, and the view interface system transmits to the backend view controller requests associated with the view format and the second view format;

transmitting, to the backend view controller, the second data set request via the communications channel;

receiving, at the view interface system via the communications channel from the backend view system, the data set;

performing, by the view interface system, another two-way data binding of the data set to second interface objects associated with the second view format to form a second user interface based on the second view format;

displaying, by the view interface system, the second user interface;

receiving, by the view interface system, a data notification regarding a change to at least one data element in the data set;

updating, based on the data notification, the user interface to reflect the change to the at least one data element; and updating, based on the data notification, a second user interface to reflect the change to the at least one data element.

8. The non-transitory computer-readable device of claim 7, wherein the view format comprises at least one of a two-dimensional interface, a three-dimensional interface, or a virtual reality interface.

9. The non-transitory computer-readable device of claim 7, the operations further comprising;

connecting the view interface system to the backend view controller to the view adapter to provide the view format; and connect the view interface system to the backend view controller through the second view adapter to provide the second view format.

10. The non-transitory computer-readable device of claim 8, the operations further comprising:

receiving, by the view interface system, a data notification regarding a change to at least one data element in the data set; and updating, based on the data notification, the user interface to reflect the change to the at least one data element.

\* \* \* \* \*